United States Patent
Sudarmani et al.

(10) Patent No.: US 11,199,998 B2
(45) Date of Patent: Dec. 14, 2021

(54) NON-VOLATILE DUAL IN-LINE MEMORY MODULE (NVDIMM) DEVICE ASSISTED OPERATIONS MANAGEMENT

(71) Applicant: Samsung Electronics Co., Ltd., Suwon-si (KR)

(72) Inventors: Rengaraja Sudarmani, Bengaluru (IN); Manas Anant Savkoor, Bengaluru (IN); Prashant Vishwanath Mahendrakar, Bangalore (IN)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 16/751,437

(22) Filed: Jan. 24, 2020

(65) Prior Publication Data

US 2021/0034294 A1 Feb. 4, 2021

(30) Foreign Application Priority Data

Aug. 2, 2019 (IN) .............................. 201941031341

(51) Int. Cl.
*G06F 13/00* (2006.01)
*G06F 3/06* (2006.01)
(Continued)

(52) U.S. Cl.
CPC ............ *G06F 3/0659* (2013.01); *G06F 3/061* (2013.01); *G06F 3/0653* (2013.01);
(Continued)

(58) Field of Classification Search
CPC ...... G06F 3/0659; G06F 3/0653; G06F 3/061; G06F 9/30047; G06F 9/542; G06F 9/4881; G06F 3/0679
See application file for complete search history.

(56) References Cited

U.S. PATENT DOCUMENTS

2017/0322726 A1* 11/2017 Walker ................ G06F 13/1626
2018/0059944 A1* 3/2018 Helmick ................ G11C 29/52
(Continued)

OTHER PUBLICATIONS

"DDRx NVDIMM-P Bus Protocol", Jedec, Solid State Technology Assocation.
(Continued)

*Primary Examiner* — Jing-Yih Shyu
(74) *Attorney, Agent, or Firm* — Harness, Dickey & Pierce, P.L.C.

(57) ABSTRACT

Embodiments herein provide a Non-Volatile Dual In-Line Memory Module (NVDIMM) device assisted operations management method. The method includes on sending, by the host, a read command to the NVDIMM device receiving, by the host, an URGENT signal upon which it issues a SEND Command and receives a message packet form the NVDIMM device, wherein the message packet comprises information about a time required by the NVDIMM device to read the particular data and an information about operations at the NVDIMM device. Further, the method includes performing, by the host, configuration of the host in a power down mode based on the time required by the NVDIMM device to read the particular data and an information about operations at the NVDIMM device, or performing scheduling operations based on time required by the NVDIMM device to read the particular data and the information about operations at the NVDIMM device.

19 Claims, 13 Drawing Sheets

(51) Int. Cl.
*G06F 9/30* (2018.01)
*G06F 9/54* (2006.01)
*G06F 9/48* (2006.01)

(52) U.S. Cl.
CPC ........ *G06F 3/0679* (2013.01); *G06F 9/30047* (2013.01); *G06F 9/4881* (2013.01); *G06F 9/542* (2013.01)

(56) References Cited

U.S. PATENT DOCUMENTS

| | | | |
|---|---|---|---|
| 2020/0050366 A1* | 2/2020 | Bavishi | G06F 3/0604 |
| 2020/0050397 A1* | 2/2020 | Meyerowitz | G06F 3/0659 |
| 2020/0050398 A1* | 2/2020 | Meyerowitz | G06F 3/0619 |
| 2021/0035649 A1* | 2/2021 | Muchherla | G06F 3/064 |

OTHER PUBLICATIONS

"DDR4 SDRAM", Jedec Standard, Jedec Solid State Techology Association. Nov. 2013.
"DDR4 SDRAM", Micron, Micron Technology, Inc. 2015.

* cited by examiner

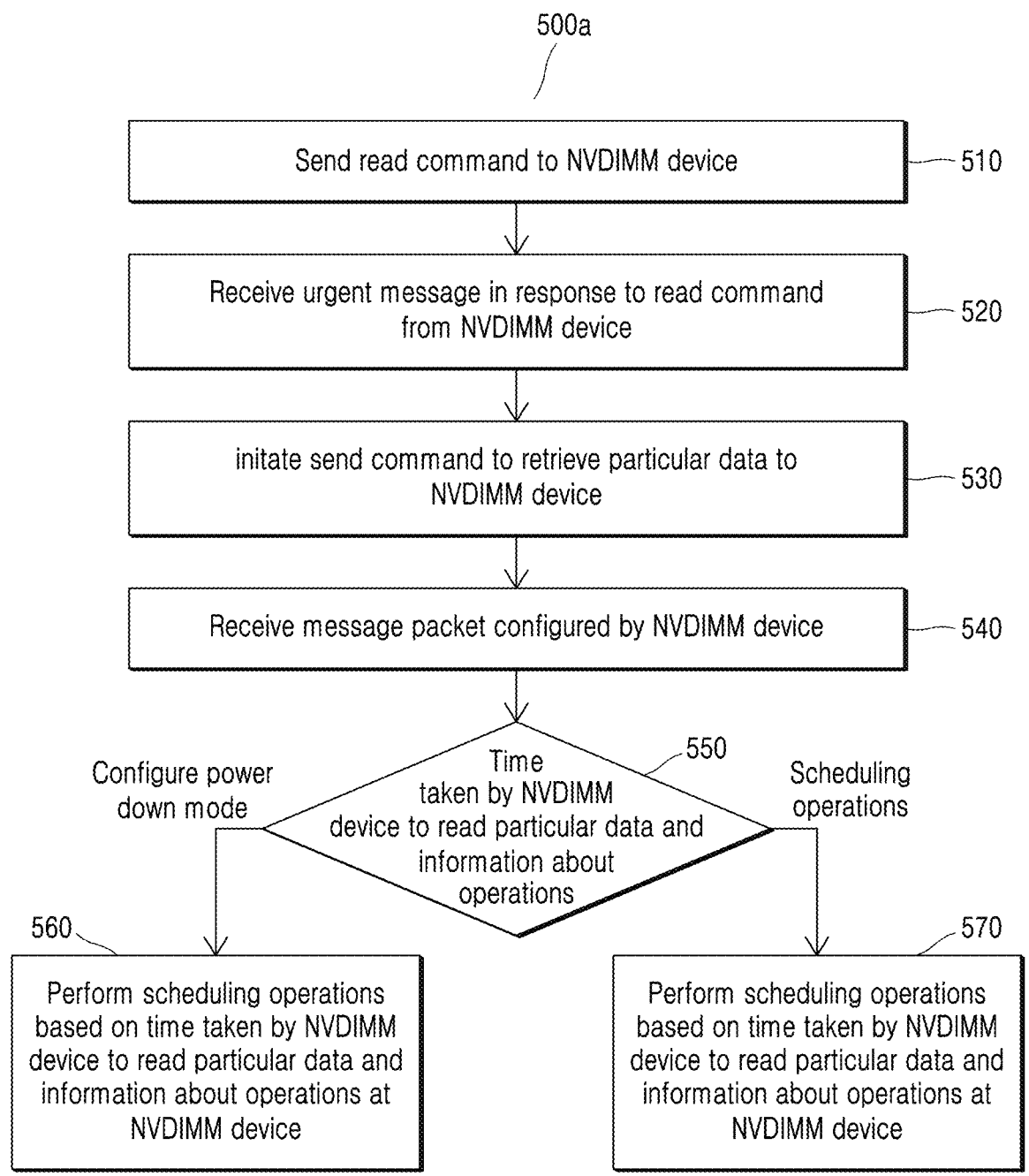

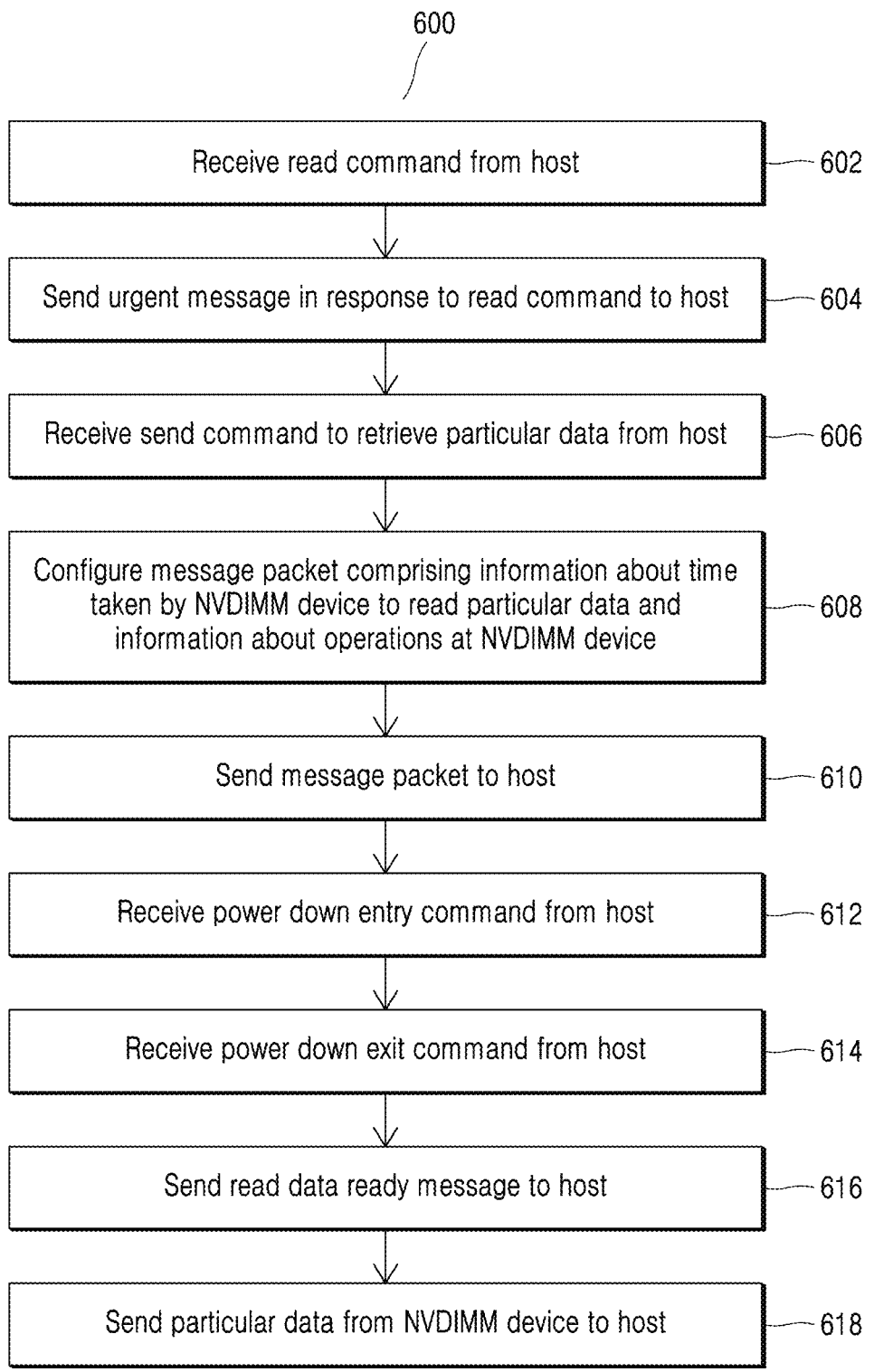

NON-VOLATILE DUAL IN-LINE MEMORY MODULE (NVDIMM) DEVICE ASSISTED OPERATIONS MANAGEMENT

CROSS-REFERENCE TO RELATED APPLICATION

This application claims benefit of priority to India Patent Application 201941031341 filed on Aug. 2, 2019 in the India Intellectual Property Office, the disclosure of which is incorporated herein by reference in its entirety.

BACKGROUND

Technical Field

Example embodiments herein relate to Non-Volatile Dual In-Line Memory Module (NVDIMM) system. For example, at least some example embodiments relate to a Non-Volatile Dual In-Line Memory Module (NVDIMM) device assisted operations management.

Background

Computer systems use dual in-line memory modules (DIMMs) attached to a central processing unit (CPU) to store data. In general, the DIMMs contain dynamic random-access memory (DRAM) chips, which may use a large amount of power leading to a reduction in the processing power of the CPU. Therefore, non-volatile DIMMs (NVDIMMs) have been developed to replace volatile DRAM chips with non-volatile memory devices. The NVDIMMs provide lower power consumption with longer data retention capacity.

However when a host sends a command to a NVDIMM device to perform some action, the NVDIMM device takes a considerable amount of time to perform the requested action. The host may not be aware of the amount of time that the NVDIMM device will take to perform the requested action and may remain idle/waiting during this time.

In the computer systems when power consumption is one of the major constraints, the host waiting till the NVDIMM device fetches the data will reduce the processing capacity, performance and consumes more power.

The above information is presented as background information only to help the reader to understand the example embodiments. Applicants have made no determination and make no assertion as to whether any of the above might be applicable as prior art with regard to the present application.

SUMMARY

In one or more example embodiments, the idle time of the host is utilize effectively to enhance the performance as well as the power of the computer systems.

One or more example embodiments facilitate configuration by the NVDIMM device of a message packet including information about a time required by the NVDIMM device to read a particular data and an information about operations at the NVDIMM device. The NVDIMM device sends the message packet to a host.

One or more example embodiments, allow for a configuration of the host in a power down mode based on the time required by the NVDIMM device to read the particular data and an information about operations at the NVDIMM device, or perform scheduling operations based on time required by the NVDIMM device to read the particular data and the information about operations at the NVDIMM device.

One or more example embodiments facilitate configuration of the host in the power down mode till at least one of the NVDIMM device completes a flush operation of at least one of a read operation(s) and/or a write operation(s), the NVDIMM device completes a garbage collection, the NVDIMM device collate a group of read identifiers (RIDs) and send it to the host, the NVDIMM device perform a Process in Memory (PIM) function, and/or the NVDIMM device perform a Process in Buffer (PIB) function.

Accordingly an example embodiment herein provide a method of controlling a Non-Volatile Dual In-Line Memory Module (NVDIMM) device by a host. In some example embodiments, the method includes sending, by the host, a read command to the NVDIMM device, receiving, by the host, a message packet from the NVDIMM device, the message packet including one or more of read time information indicating a read time associated with the NVDIMM device reading data and or operational information indicating operations at the NVDIMM device; and performing, by the host, one or more of configuration of a DIMM line in a power down mode or scheduling operations based on read time information and the operational information.

Accordingly an example embodiments herein provide a method of operating a Non-Volatile Dual In-Line Memory Module (NVDIMM) device. In some example embodiments, the method includes receiving, by the NVDIMM device, a read command from a host; configuring, by the NVDIMM device, a message packet, the message packet including read time information indicating a read time associated with the NVDIMM device reading data and operational information indicating operations at the NVDIMM device; and sending, by the NVDIMM device, the message packet to the host.

Accordingly an example embodiments herein provide a host connected to a Non Volatile Dual Inline Memory Module (NVDIMM) device. In some example embodiments, the host includes a memory; a DIMM socket; and a NVDIMM controller coupled to the memory, the NVDIMM controller configured to, send a read command to the NVDIMM device, receive a message packet from the NVDIMM device, the message packet including read time information indicating a read time associated with the NVDIMM device reading data and operational information indicating operations at the NVDIMM device, and perform one of configuration of the host in a power down mode or scheduling operations based on the read time and the operational information.

Accordingly an example embodiments herein provide a Non Volatile Dual Inline Memory Module (NVDIMM) device connected to a host. In some example embodiments, the NVDIMM device includes a DRAM; a DIMM socket; and a NVDIMM controller configured to, receive a read command from the host, configure a message packet such that the message packet includes read time information indicating a read time associated with the NVDIMM device reading data and operational information indicating operations at the NVDIMM device, and send the message packet to the host.

Accordingly an example embodiments herein provide a Non-Volatile Dual In-Line Memory Module (NVDIMM) device assisted operations management system. In some example embodiments, the NVDIMM device assisted operations management system includes a Non Volatile Dual Inline Memory Module (NVDIMM) device configured to configure a message packet such that the message packet includes read time information indicating a read time associated with the NVDIMM device reading data and operational information about operations at the NVDIMM device; and a host configured to, send a read command to the NVDIMM device, receive an urgent message in response to the read command from the NVDIMM device, send a send command to retrieve a particular data to the NVDIMM device, receive the message packet from the NVDIMM device, send a power down entry command to the NVDIMM device, detect that the read time has elapsed, send a power down exit command to the NVDIMM device, receive a read data ready signal from the NVDIMM device, and retrieve the data from the NVDIMM device in response to the read data ready signal.

These and other aspects of the example embodiments herein will be better appreciated and understood when considered in conjunction with the following description and the accompanying drawings. It should be understood, however, that the following descriptions of some example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Example embodiments are illustrated in the accompanying drawings, throughout which like reference letters indicate corresponding parts in the various figures. The example embodiments herein will be better understood from the following description with reference to the drawings, in which:

FIG. 5A is a flow chart illustrating NVDIMM device assisted operations management method in the host, according to an example embodiment as disclosed herein;

FIG. 6 is a flow chart illustrating a method of managing operations of the host using the NVDIMM device, according to an example embodiment as disclosed herein.

DETAILED DESCRIPTION

Figure 1:
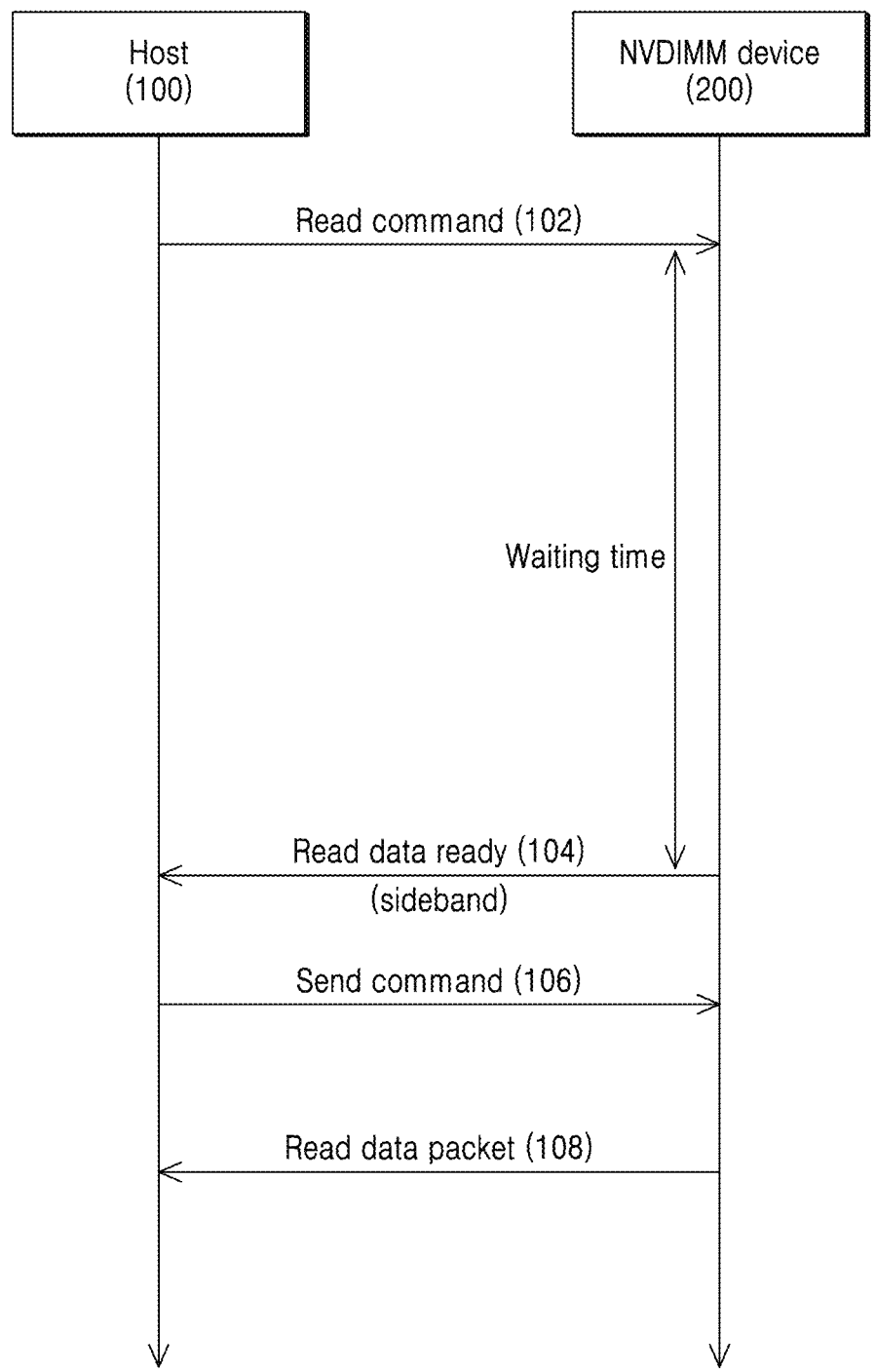
FIG. 1 is a sequence diagram illustrating various operations performed by a host and a Non-Volatile Dual In-Line Memory Module (NVDIMM) device for reading data from the NVDIMM device, according to prior art.

Various example embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the example embodiments described herein can be made without departing from the scope and spirit of the present disclosure. In addition, descriptions of well-known functions and constructions are omitted for clarity and conciseness.

Also, the various example embodiments described herein are not necessarily mutually exclusive, as some example embodiments can be combined with one or more other embodiments to form new embodiments.

Herein, the term "or" as used herein, refers to a non-exclusive or, unless otherwise indicated. The examples used herein are intended merely to facilitate an understanding of ways in which the example embodiments herein can be practiced and to further enable those skilled in the art to practice the example embodiments herein. Accordingly, the examples should not be construed as limiting the scope of the example embodiments herein.

As is traditional in the field, example embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the disclosure Likewise, the blocks of the example embodiments may be physically combined into more complex blocks without departing from the scope of the disclosure.

Accordingly the example embodiments herein provide a Non-Volatile Dual In-Line Memory Module (NVDIMM) device assisted operations management method. The method includes sending, by the host, a read command to the NVDIMM device and receiving, by the host, a message packet from the NVDIMM device, wherein the message packet includes information about a time required by the NVDIMM device to read the particular data and information about operations at the NVDIMM device. Further, the method includes performing, by the host, configuration of the host in a power down mode based on the time required by the NVDIMM device to read the particular data and an information about operations at the NVDIMM device, or performing scheduling operations based on time required by the NVDIMM device to read the particular data and the information about operations at the NVDIMM device.

In an example embodiment, receiving, by the host, the message packet from the NVDIMM device includes receiving, by the host, an urgent message in response to the read command from the NVDIMM device and sending, by the host, a send command to retrieve a particular data to the NVDIMM device. The method also includes receiving, by the host, the message packet configured by the NVDIMM device.

In an example embodiment, configuring the host in the power down mode includes determining that the information about operations at the NVDIMM device indicates at least one of a miss case in a read operation, a write through policy is used in a write operation, a flush operation, a garbage collection operation, a collate operation, a PIM function, a PIB function and configuring the host in power down mode based on the time required by the NVDIMM device to read the particular data.

In an example embodiment, the host is configured in the power down mode till at least one of the NVDIMM device completes the flush operation of at least one of a read operation and a write operation, the NVDIMM device completes the garbage collection, the NVDIMM device collate a group of RIDs and send it to the host, the NVDIMM device perform the PIM function, and the NVDIMM device perform the PIB function.

In an example embodiment, the method further includes sending, by the host, a power down entry command to the NVDIMM device and detecting, by the host, that the time required by the NVDIMM device to read the particular data is completed. Further, the method also includes sending, by the host, a power down exit command to the NVDIMM device and receiving, by the host, a read data ready signal from the NVDIMM device. Furthermore, the method includes retrieving, by the host, the particular data from the NVDIMM device in response to the read data ready signal.

In an example embodiment, performing the scheduling operations based on time required by the NVDIMM device to read the particular data and an information about operations at the NVDIMM device includes determining that the information about operations at the NVDIMM device does not indicate at least one of a miss case in a read operation, a write through policy is used in a write operation, a flush operation, a garbage collection operation, a collate operation, a PIM function, a PIB function and performing the scheduling operations based on time required by the NVDIMM device to read the particular data and information about operations at the NVDIMM device.

In the conventional methods and systems, when the host sends the read command to the NVDIMM device, the host may need to wait till the NVDIMM device sends a read ready when the data requested to be fetched is read by the NVDIMM device. Unlike to the conventional methods and systems, in one or more example embodiments, the NVDIMM device indicates to the host the time required to fetch the data. Hence, the host is aware of the time the NVDIMM device will require to fetch the data beforehand and can utilize the time to schedule some other operation or initiate the power down mode.

For example, in one or more example embodiments, the NVDIMM device may send a message packet to indicate to the host the time required to fetch the data and other information regarding the operations to be performed by the NVDIMM device.

Referring now to the drawings, and more particularly to FIGS. 1 through 7, where similar reference characters denote corresponding features consistently throughout the figures, there are shown preferred embodiments.

FIG. 1 is a sequence diagram illustrating various operations performed by a host and a Non-Volatile Dual In-Line Memory Module (NVDIMM) device for reading data from the NVDIMM device, according to prior art.

Referring to FIG. 1, consider that the host sends a 'read' command (102) to the NVDIMM device, requesting the NVDIMM device to fetch a particular data from a specific address. The NVDIMM device takes time to fetch the data while the host is waiting for the data (as seen in FIG. 1). After a specific duration of time, the NVDIMM device sends a read data ready signal to the host (104) indicating that the requested data is ready to be read. The host then responds to the NVDIMM device by sending a send command (106), in response to which the NVDIMM device sends the requested data (108) to the host.

Figure 2A:
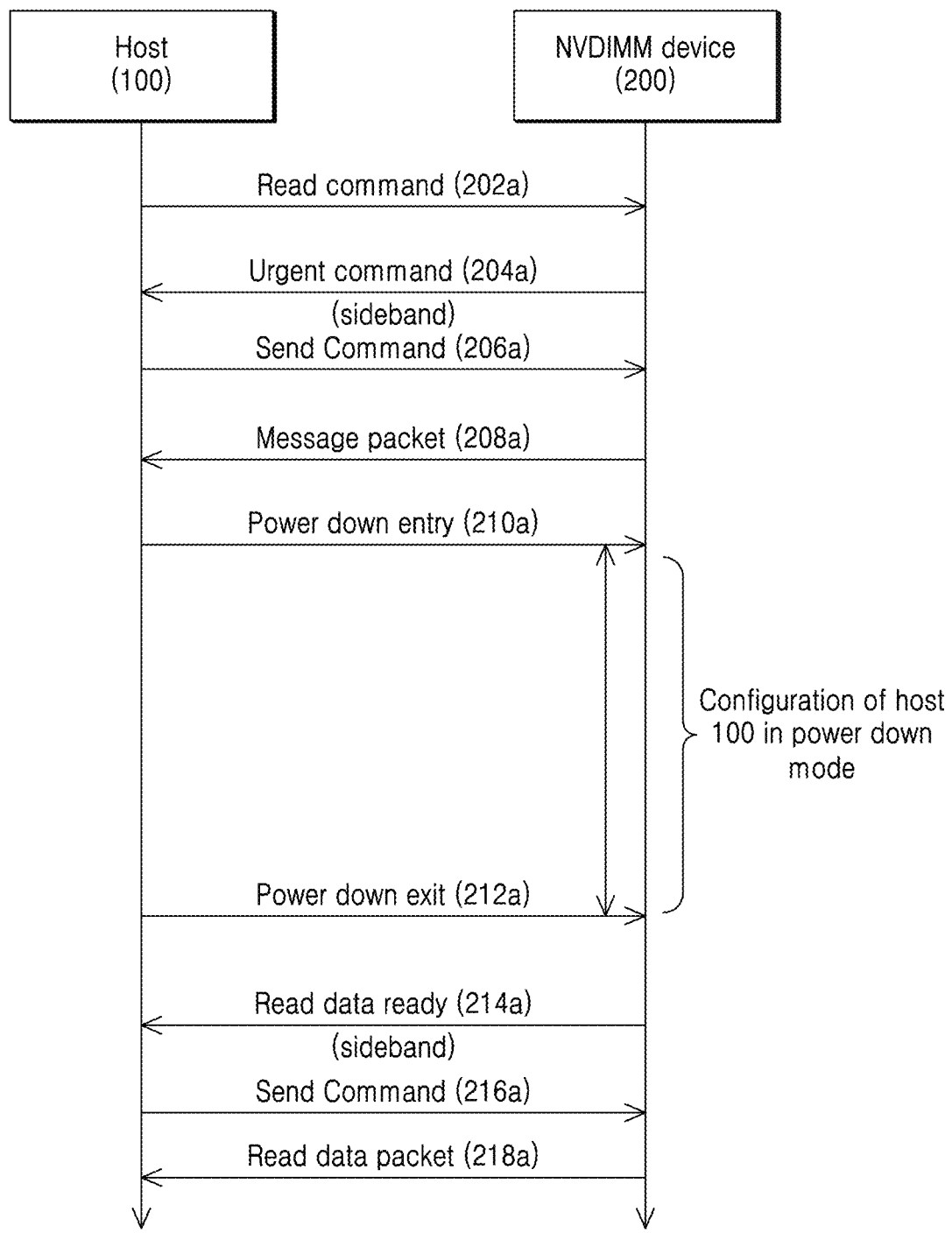
FIG. 2A is a sequence diagram illustrating various operations performed by the host and the NVDIMM device for reading data from the NVDIMM device, when the host is configured in a power down mode, according to an example embodiment as disclosed herein.

FIG. 2A is a sequence diagram illustrating various operations performed by the host 100 and the NVDIMM device 200 for reading data from the NVDIMM device 200, when the host 100 is configured in the power down mode, according to an example embodiment as disclosed herein.

Unlike to the conventional methods and systems, in the proposed method the NVDIMM device 200 indicates to the host 100 the time required by the NVDIMM device 200 to fetch the data requested by the host 100. Therefore, the host 100 is informed about the time after which the data will be available and hence can perform other operations or initiate the power down mode. Thus, in the proposed method the processing is enhanced and the power can be saved during the waiting time.

Referring to the FIG. 2A, at step 202a the host 100 sends the read command to the NVDIMM device 200 requesting to read data from a specific address. At step 204a, the NVDIMM device 200 responds by sending an urgent (sideband) signal to the host 100 indicating the availability of information about the fetched data at the NVDIMM device 200. At step 206a, the host 100 sends the send command informing the NVDIMM device 200 to share the information about the data requested. In response, the NVDIMM device 200 sends the 'message packet' to the host 100, at step 208a. The message packet includes information regarding the time required by the NVDIMM device 200 to read the particular data and the information about operations at the NVDIMM device 200.

At step 210a, the host 100 receives the 'message packet' and analyzes the information regarding the time required by the NVDIMM device 200 to read the particular data and the information about operations at the NVDIMM device 200.

Further, based on the information in the 'message packet', the host 100 configures itself in the power down mode by sending the power down entry command.

At step 212a, the host 100 sends the power down exit command to the NVDIMM device 200, when the NVDIMM device 200 is ready to send the requested data.

At step 214a, the NVDIMM device 200 sends the read data ready signal indicating to the host 100 that the requested data is ready to be sent.

At step 216a, in response the host 100 sends the 'send' command to the NVDIMM device 200 and, at step 218a, the NVDIMM device 200 responds by sharing the data requested by the host 100.

Figure 2B:
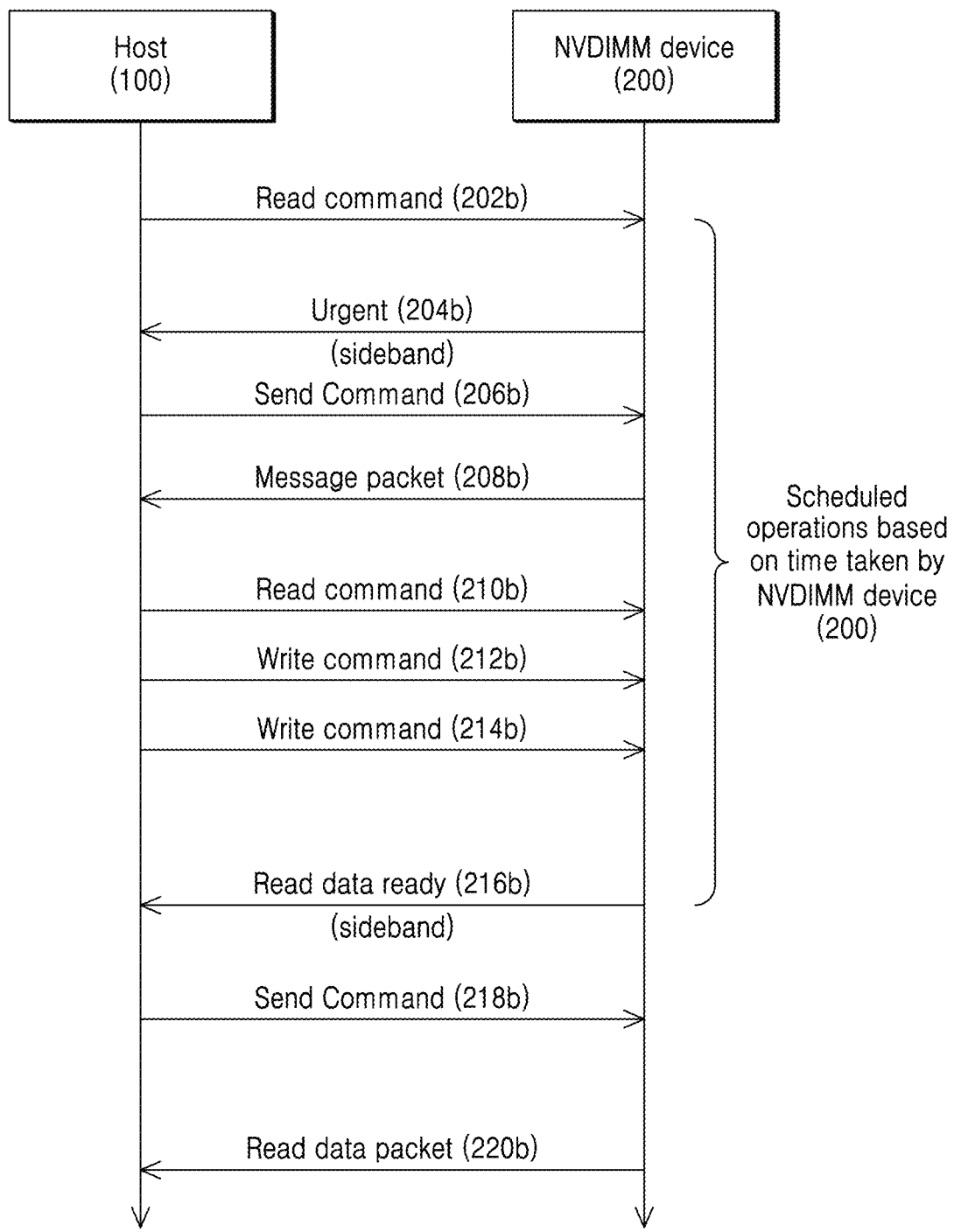
FIG. 2B is a sequence diagram illustrating various operations performed by the host and the NVDIMM device for reading data from the NVDIMM device, when the host is performing scheduling of operations, according to an example embodiment as disclosed herein.

FIG. 2B is a sequence diagram illustrating various operations performed by the host 100 and the NVDIMM device 200 for reading data from the NVDIMM device 200, when the host 100 is performing scheduling of operations, according to an example embodiment as disclosed herein.

Referring to FIGS. 2A and 2B, steps 202b to 206b may be substantially the same as steps 202a to 206a, and, thus repeated description is omitted. At step 208b, the host 100 receives the 'message packet' and analyzes the information regarding the time required by the NVDIMM device 200 to read the particular data and the information about operations at the NVDIMM device 200.

Further, based on the information in the 'message packet', at step 210b, the host 100 performs scheduling of the operations such as read, write, etc. (as indicated in steps 210b-214b) based on the time required by the NVDIMM device 200 to read the requested data and the information about the operations at the NVDIMM device 200.

At step 216b, the NVDIMM device 200 sends the read data ready signal indicating to the host 100 that the requested data is ready to be sent. At step 218b, in response the host 100 sends the 'send' command to the NVDIMM device 200. Further, at step 220b, the NVDIMM device 200 responds by sharing the data requested by the host 100.

Unlike in the conventional methods and systems, which have a long waiting period between the host 100 sending the read command and the NVDIMM device 200 sending the requested data to the host 100, in one or more example embodiments, the host 100 can perform one of the power down mode (FIG. 2A) and schedule operations (FIG. 2B) in the waiting time.

Figure 3A:
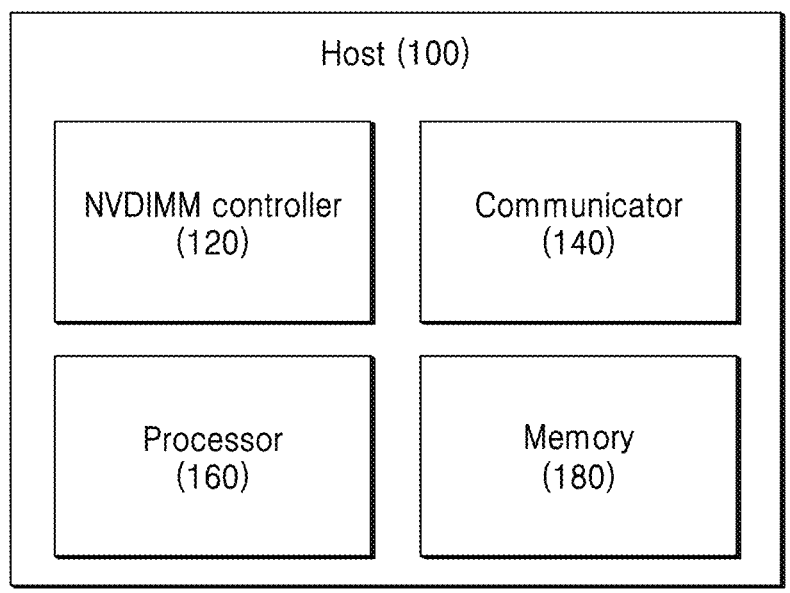
FIG. 3A is a block diagram of the host whose operations are managed using the NVDIMM device, according to an example embodiment as disclosed herein.

FIG. 3A is a block diagram of the host 100 whose operations are managed using the NVDIMM device 200, according to an example embodiment as disclosed herein.

Referring to the FIG. 3A, the host 100 includes a non-volatile dual in-line memory module (NVDIMM) controller 120, a communicator 140, a processor 160 and a memory 180.

In an example embodiment, the NVDIMM controller 120 is configured to send the read command requesting the NVDIMM device 200 to fetch the data from the specific address. Further, the NVDIMM controller 120 is configured to receive the message packet configured by the NVDIMM device 200. The message packet includes the information about the time required by the NVDIMM device 200 to read the particular data and the information about the operations at the NVDIMM device 200. Further, the NVDIMM controller 120 is configured to perform configuration of the host 100 in the power down mode based on the time required by the NVDIMM device 200 to read the particular data and the information about operations at the NVDIMM device or perform scheduling operations based on the time required by the NVDIMM device 200 to read the particular data and the information about operations at the NVDIMM device 200.

In an example embodiment, the communicator 140 is configured to perform signaling functions between the host 100 and the NVDIMM device 200, such as sending and receiving the various commands over the various command lines of a storage device.

In an example embodiment, the processor 160 is configured to interact with the hardware elements such as the NVDIMM controller 120, the communicator 140 and the memory 180.

In an example embodiment, the memory 180 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 180 may, in some examples, be considered a non-transitory storage medium. The term "non-transitory" may indicate that the storage medium is not embodied in a carrier wave or a propagated signal. However, the term "non-transitory" should not be interpreted that the memory 180 is non-movable. In some examples, the memory 180 is configured to store larger amounts of information than the memory. In certain examples, a non-transitory storage medium may store data that can, over time, change (e.g., in Random Access Memory (RAM) or cache).

Although the FIG. 3A shows the hardware elements of the host 100 but it is to be understood that other embodiments are not limited thereon. In other example embodiments, the host 100 may include less or more number of elements. Further, the labels or names of the elements are used only for illustrative purpose and does not limit the scope of the example embodiments. One or more components can be combined together to perform same or substantially similar function of the host 100 which is used to manage the operations based on the assistance of the NVDIMM device 200.

Figure 3B:
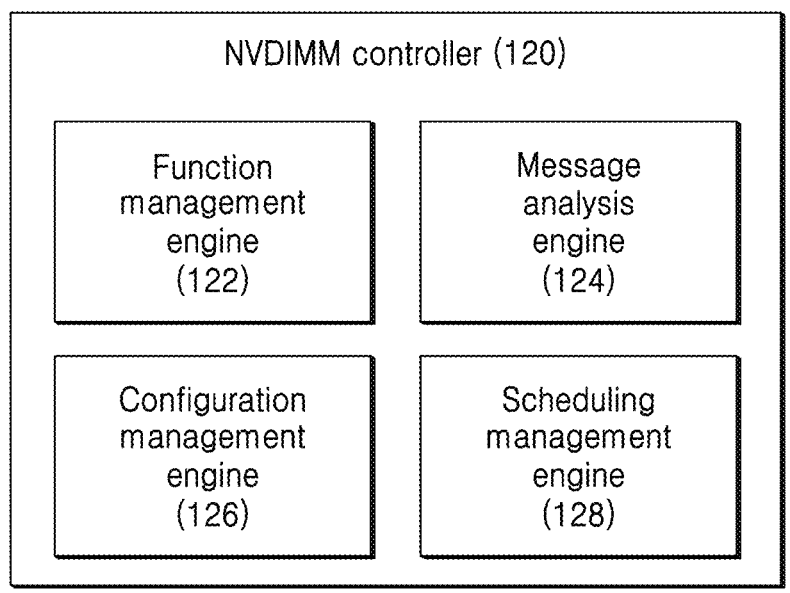
FIG. 3B is a block diagram of a NVDIMM controller of the host, according to an example embodiment as disclosed herein.

FIG. 3B is a block diagram of the NVDIMM controller 120 of the host 100, according to an example embodiment as disclosed herein.

Referring to the FIG. 3B, the NVDIMM controller 120 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The processing circuitry may be configured to perform the functions of a function management engine 122, a message analysis engine 124, a configuration management engine 126 and a scheduling management engine 128.

In an example embodiment, the function management engine 122 is configured to determine the function which needs to be initiated by the host 100 in the NVDIMM device 200 such as for example, read data, write data, etc. The function management engine 122 is also configured to send the read command requesting the NVDIMM device 200 to fetch the particular data from the specific address, when the particular data has to be read.

Further, the function management engine 122 is configured to send the power down entry command to the NVDIMM device 200, based on the input from the configuration management engine 126 which initiates the power down mode. The function management engine 122 sends the power down exit command to the NVDIMM device 200, when the particular data is ready to be sent by the NVDIMM device 200.

In an example embodiment, the message analysis engine 124 is configured to receive the urgent message in response to the read command sent by the host 100, from the NVDIMM device 200. The urgent message is a single bit command indicating, to the host 100, the availability of information regarding the time required by the NVDIMM device 200 to provide the data requested by the host 100. Further, message analysis engine 124 is configured to send the send command to retrieve the particular data from the NVDIMM device 200 and receive the message packet which is configured by the NVDIMM device 200. The message packet includes the information about the time required by the NVDIMM device 200 to read the particular data and the information about the operations at the NVDIMM device 200. The message analysis engine 124 analyzes the 'message packet' i.e., the information regarding the time required by the NVDIMM device 200 to read the particular data and the information about operations at the NVDIMM device 200. The message analysis engine 124 analyses the 'message packet' by determining that the information about operations at the NVDIMM device 200 indicates at least one of the miss case in the read operation, the write through policy is used in the write operation, the flush operation, the garbage collection operation, the collate operation, the PIM function and the PIB function.

In an example embodiment, the configuration management engine 126 configures the host 100 in the power down mode when the 'message packet' includes information about operations at the NVDIMM device 200 indicating at least one of the miss case in the read operation, the write through policy is used in the write operation, the flush operation, the garbage collection operation, the collate operation, the PIM function and the PIB function. Further, the configuration management engine 126 retains the power down mode till at least one of the NVDIMM device 200 completes the flush operation of at least one of the read operation and the write operation, the NVDIMM device 200 completes the garbage collection, the NVDIMM device 200 collates the group of Read identifiers (RIDs) and send it to the host 100, the NVDIMM device 200 performs the processing-in-memory (PIM) function, and the NVDIMM device perform the process information block (PIB) function.

For example, consider that the message packet indicates that the data requested by the host 100 will be available after 20 nanoseconds. Then, the host 100 initiates the power down mode by sending the power down entry command to the NVDIMM device 200. Further, when 19 nanoseconds have elapsed, the NVDIMM device 200 initiates the power down exit command, as the requested data will be available at the end of 20 nanoseconds.

In an example embodiment, the scheduling management engine 128 is configured to determine that the information about operations at the NVDIMM device 200 does not indicate at least one of the miss case in the read operation, the write through policy is used in the write operation, the flush operation, the garbage collection operation, the collate operation, the PIM function, the PIB function. Further, the scheduling management engine 128 is configured to perform the scheduling operations based on the time required by the NVDIMM device 200 to read the particular data and information about operations at the NVDIMM device 200.

Figure 4A:
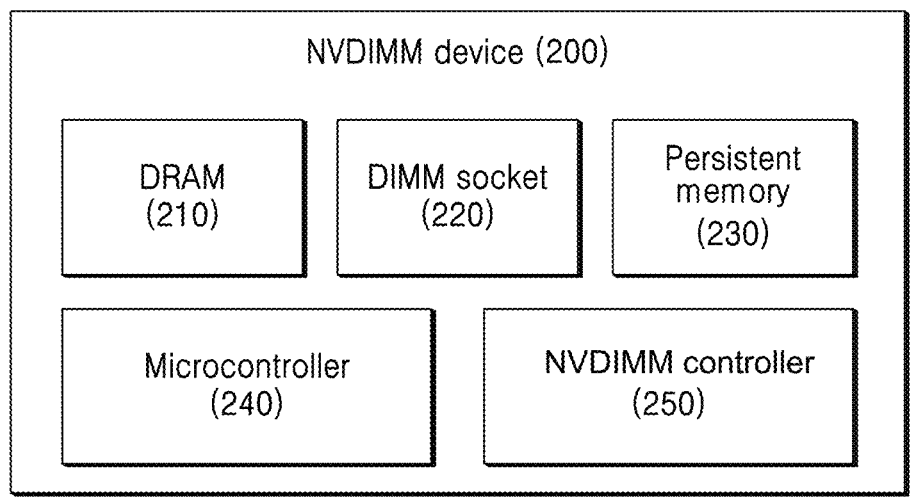
FIG. 4A is a block diagram of the NVDIMM device which is used to manage the operations of the host, according to an example embodiment as disclosed herein.

FIG. 4A is a block diagram of the NVDIMM device 200 which is used to manage the operations of the host 100, according to an example embodiment as disclosed herein.

Referring to the FIG. 4A, the NVDIMM device 200 includes a DRAM 210, a DIMM socket 220, a Persistent memory 230, a Microcontroller 240 and a NVDIMM controller 250.

In an example embodiment, the persistent memory 230 is configured to combines the DRAM 210 and the DIMM socket 220.

In an example embodiment, the microcontroller 240 is embedded in the NVDIMM device 200. The microcontroller 240 is configured to manage the data transfers between the host 100 and a specified one of the DIMM socket 220 in which the NVDIMM device 200 is accommodated as a Direct memory access (DMA) reads and writes, format data received from the PCIe interface for transmission to the specified DIMM socket 220.

In an example embodiment, the NVDIMM controller 250 is configured to receive the read command from the host 100 requesting to fetch the particular data from the specific address. The read command may be a single read command or a plurality of read commands. Further, the NVDIMM controller 250 determines the time required by the NVDIMM device 200 to read the particular data and the information about the operations at the NVDIMM device 200 and configures the 'message packet' including the information about the time required by the NVDIMM device 200 to read the particular data and information about the operations at the NVDIMM device 200. The NVDIMM controller 250 is configured to send the 'message packet' to the host 100. Further, the NVDIMM controller 250 sends the particular data to the host 100 after reading the particular data.

Although the FIG. 4A shows a particular configuration of the hardware elements of the NVDIMM device 200, it is to be understood that example embodiments are not limited thereto. In other example embodiments, the NVDIMM device 200 may include less or more number of elements. Further, the labels or names of the elements are used only for illustrative purpose and does not limit the scope of the example embodiments. One or more components can be combined together to perform same or substantially similar function of the NVDIMM device 200 which is used to manage the operations of the host 100.

Figure 4B:
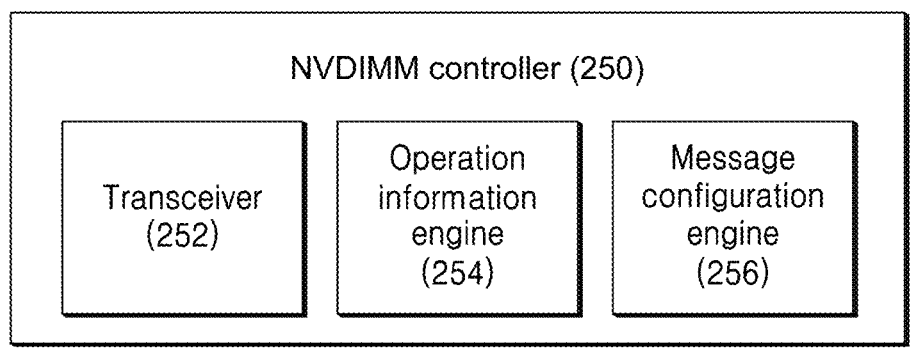
FIG. 4B is a block diagram of a NVDIMM controller of the NVDIMM device, according to an example embodiment as disclosed herein.

FIG. 4B is a block diagram of the NVDIMM controller 250 of the NVDIMM device 200, according to an example embodiment as disclosed herein.

Referring to the FIG. 4B, the NVDIMM controller 250 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The processing circuitry may be configured to perform the functions of a transceiver 252, an operation information engine 254 and a message configuration engine 256.

In an example embodiment, the transceiver 252 is configured to perform signaling functions with the host 100 such as sending and receiving the various commands over the various command lines. The transceiver 252 is configured to receive the read command from the host and to send the 'urgent' message to the host 100 and send the read ready command when the particular data requested by the host 100 is fetched. The transceiver 252 is also configured to receive the send read data command and send the particular data to the host 100.

In an example embodiment, the operation information engine 254 is configured to receive the read command from the host 100 requesting to fetch the particular data from the specific address. Further, the operation information engine 254 determines the time required by the NVDIMM device 200 to read the particular data from the specific address and the information about the operations at the NVDIMM device 200.

In an example embodiment, the message configuration engine 256 is configured to configure the 'urgent' message. The 'urgent' message is a single bit message initiated by the NVDIMM device 200 which can be sent to the host 100 to indicate the availability of information regarding the previous 'read' command, current status of the 'read' command, and the like. Further, the message configuration engine 256 configures the 'message packet' which includes the information about the time required by the NVDIMM device 200 to read the particular data and the information about the operations at the NVDIMM device 200. The message packet is sent on the data line (DQ#). The message packets from 32 to 63 are unused and hence can be utilized for indicating at least one of the missed case in the read operation, the write through policy is used in the write operation, the flush operation, the garbage collection operation, the collate operation, the PIM function and the PIB function.

For example consider a miss case in the read operation (in table. 1). Then the UI0 bit of the data line DQ32 is set to 1, to indicate the miss case in the read operation. Further, the UI1 bit is set when the time data available is in micro seconds (μs) and the UI1 bit is cleared when the time data available is in nanoseconds (ns).

TABLE 1

| DQ# | UI 0 | 1 | 2 | 3 | 4 | 5 | 6 | 7 |
|---|---|---|---|---|---|---|---|---|
| 32 | Miss Case | ns/μs | | PD allowed | | Time required | | |
| 33 | Write Through | ns/μs | | PD allowed | | Time required | | |
| 34 | FLUSH | μs/ms | | PD allowed | | Time required | | |
| 35 | Garbage | μs/ms | | PD allowed | | Time required | | |
| 36 | Collation | ns/μs | | PD allowed | | Time required | | |
| 37 | PIM0 | μs/ms | | PD allowed | | Time required | | |
| 38 | PIM1 | μs/ms | | PD allowed | | Time required | | |

The bits from UI-2-UI4 in the table.1 are used when the power down mode (PD) is allowed. When the PD allowed the format of the bits from UI2-UI4 is shown in a table.2 as PD[2] to PD[0], respectively.

TABLE 2

Power Down (PD) Allowed Table

| PD[2] | PD[1] | PD[0] | Remarks |
|---|---|---|---|
| 0 | 0 | 0 | Line only |
| 0 | 0 | 1 | Fabric + Line |
| 0 | 1 | 0 | SRAM + line |
| 0 | 1 | 1 | DRAM + Line |
| 1 | 0 | 0 | SCM + Line |
| 1 | 0 | 1 | Device except SCM |
| 1 | 1 | 0 | Full Device |
| 1 | 1 | 1 | RFU |

The bits from UI5-UI7 in the table.1 are used to indicate a Minimum Device Down Time when the PD allowed. The Minimum Device Down Time format of the bits from UI5-UI7 is shown in a table.3 as TD[2] to TD[0], respectively.

TABLE 3

Minimum Device Down Time

| T[2] | T[1] | T[0] | Remarks |
|---|---|---|---|
| 0 | 0 | 0 | 0.5 |
| 0 | 0 | 1 | 1 |
| 0 | 1 | 0 | 16 |
| 0 | 1 | 1 | 64 |
| 1 | 0 | 0 | 256 |
| 1 | 0 | 1 | 1024 |
| 1 | 1 | 0 | max |
| 1 | 1 | 1 | RFU |

FIG. 5A is a flow chart 500a illustrating NVDIMM device assisted operations management method in the host 100, according to an example embodiment as disclosed herein.

Referring to the FIG. 5A, at step 510, the host 100 sends the read command to the NVDIMM device 200. For example, in the host 100 as illustrated in the FIG. 3A, the NVDIMM controller 120 is configured to send the read command to the NVDIMM device 200.

At step 520, the host 100 receives the urgent message in response to the read command from the NVDIMM device 200. For example, in the host 100 as illustrated in the FIG. 3A, the NVDIMM controller 120 is configured to receive the urgent message in response to the read command from the NVDIMM device 200.

At step 530, the host 100 initiates a send command to retrieve the particular data to the NVDIMM device 200. For example, as illustrated in the FIG. 3A, the NVDIMM controller 120 included in the host 100 is configured to send the read command to retrieve the particular data to the NVDIMM device 200.

At step 540, the host 100 receives the message packet configured by the NVDIMM device 200. For example, as illustrated in the FIG. 3A, the NVDIMM controller 120 included in the host 100 is configured to receive the message packet configured by the NVDIMM device 200.

At step 550, the host 100 determines the time required by the NVDIMM device 200 to read the particular data and the information about operations. For example, as illustrated in the FIG. 3A, the NVDIMM controller 120 included in the host 100 is configured to determine the time required by the NVDIMM device 200 to read the particular data and the information about operations.

At step 560, the host 100 performs the configuration of the host 100 in the power down mode based on the time required by the NVDIMM device 200 to read the particular data and the information about operations at the NVDIMM device 200. For example, as illustrated in the FIG. 3A, the NVDIMM controller 120 included in the host 100 is configured to perform the configuration of the host 100 in the power down mode based on the time required by the NVDIMM device 200 to read the particular data and the information about operations at the NVDIMM device 200.

At step 570, the host 100 performs the scheduling operations based on the time required by the NVDIMM device 200 to read the particular data and the information about operations at the NVDIMM device 200. For example, as illustrated in the FIG. 3A, the NVDIMM controller 120 included in the host 100 is configured to perform the scheduling operations based on the time required by the NVDIMM device 200 to read the particular data and the information about operations at the NVDIMM device 200.

The various actions, acts, blocks, steps, or the like in the method may be performed in the order presented, in a different order or simultaneously. Further, in some example embodiments, some of the actions, acts, blocks, steps, or the like may be omitted, added, modified, skipped, or the like without departing from the scope of the example embodiments.

Figure 5B:
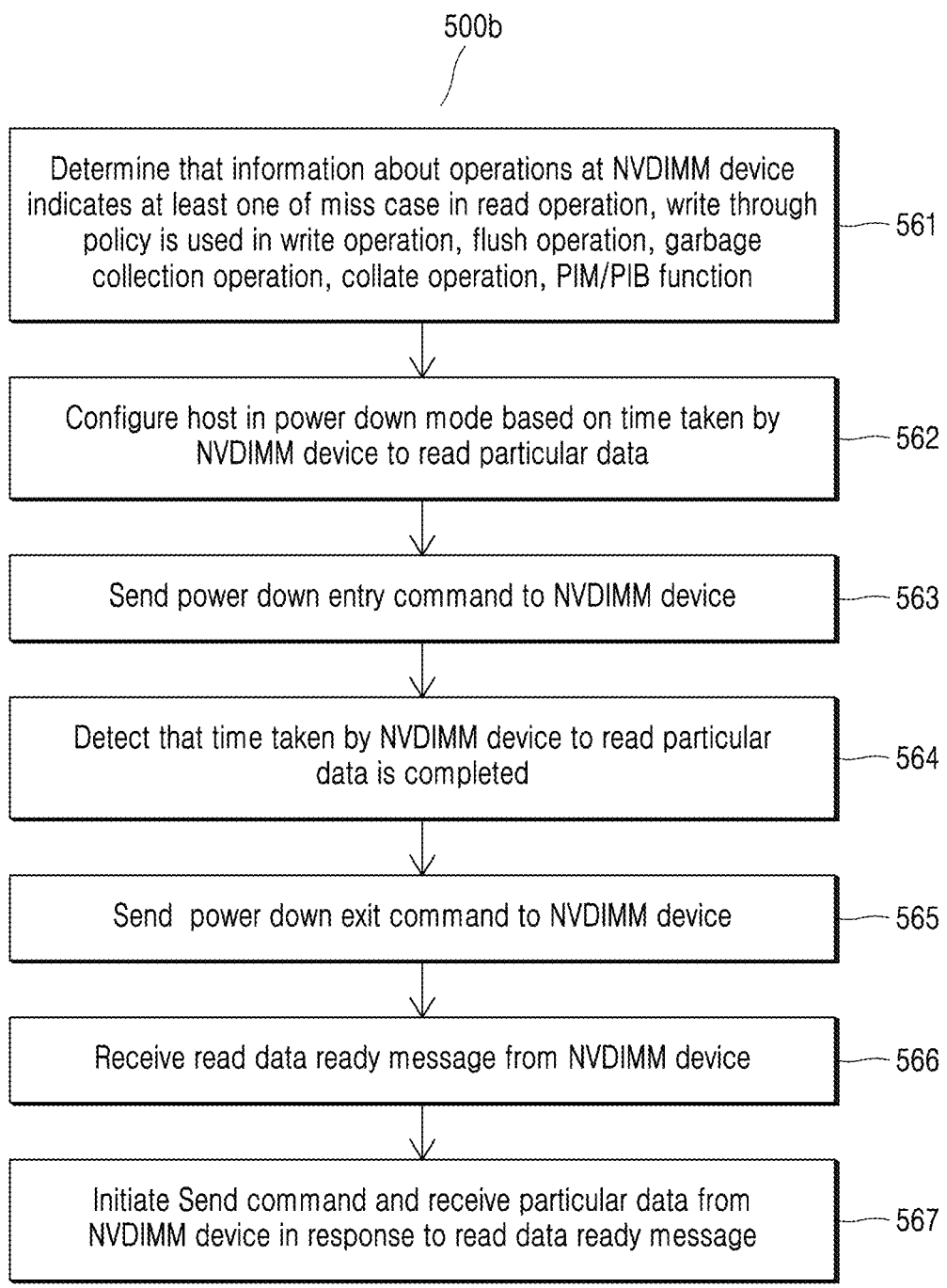
FIG. 5B is a flow chart illustrating a method of performing a configuration of the host in a power down mode based on a time required by the NVDIMM device to read a particular data and an information about operations at the NVDIMM device, according to an example embodiment as disclosed herein.

FIG. 5B is a flow chart 500b illustrating a method of performing the configuration of the host 100 in the power down mode based on the time required by the NVDIMM device 200 to read the particular data and the information about operations at the NVDIMM device 200, according to an example embodiment as disclosed herein.

Referring to the FIG. 5B, at step 561, the host 100 determines that the information about operations at the NVDIMM device 200 indicates at least one of the miss case in read operation, the write through policy is used in write operation, the flush operation, the garbage collection operation, the collate operation, the PIM/PIB function. For example, in the host 100 as illustrated in the FIG. 3A, the NVDIMM controller 120 is configured to determine that the information about operations at the NVDIMM device 200 indicates at least one of the miss case in read operation, the write through policy is used in write operation, the flush operation, the garbage collection operation, the collate operation, the PIM/PIB function.

At step 562, the host 100 configures the host 100 in power down mode based on the time required by the NVDIMM device 200 to read particular data. For example, in the host 100 as illustrated in the FIG. 3A, the NVDIMM controller 120 is configured to configure the host 100 in power down mode based on the time required by the NVDIMM device 200 to read particular data.

At step 563, the host 100 sends the power down entry command to the NVDIMM device 200. For example, in the host 100 as illustrated in the FIG. 3A, the NVDIMM controller 120 is configured to send the power down entry command to the NVDIMM device 200.

At step 564, the host 100 detects that the time required by the NVDIMM device 200 to read particular data is completed. For example, in the host 100 as illustrated in the FIG. 3A, the NVDIMM controller 120 is configured to detect that the time required by the NVDIMM device 200 to read particular data is completed.

At step 565, the host 100 sends the power down exit command to the NVDIMM device 200. For example, in the host 100 as illustrated in the FIG. 3A, the NVDIMM controller 120 is configured to send the power down exit command to the NVDIMM device 200.

At step 566, the host 100 receives the read data ready signal from the NVDIMM device 200. For example, in the host 100 as illustrated in the FIG. 3A, the NVDIMM controller 120 is configured to receive the read data ready signal from the NVDIMM device 200.

At step 567, the host 100 retrieves the particular data from the NVDIMM device 200 in response to read data ready signal. For example, in the host 100 as illustrated in the FIG. 3A, the NVDIMM controller 120 is configured to retrieve the particular data from the NVDIMM device 200 in response to read data ready signal.

Figure 5C:
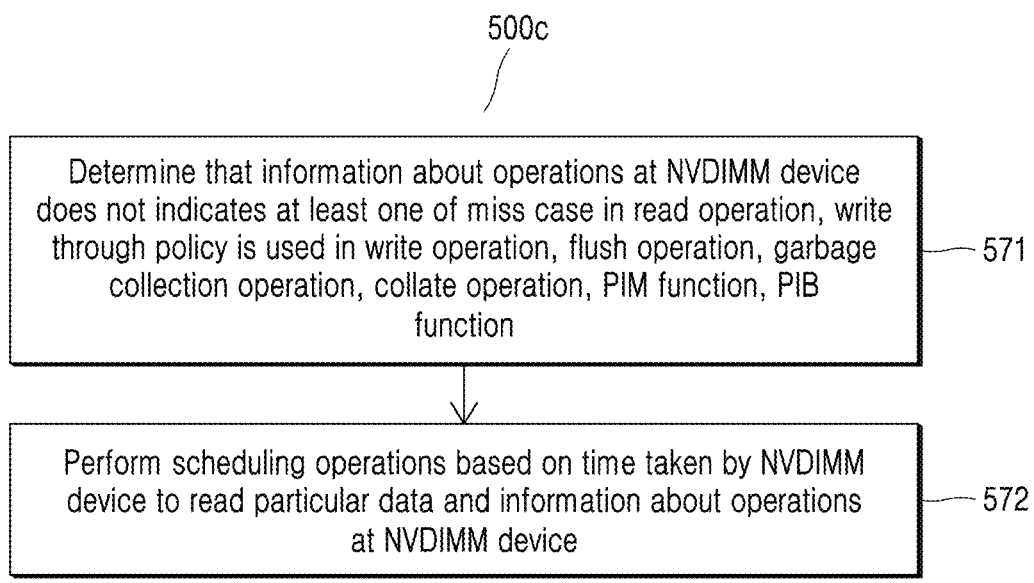
FIG. 5C is a flow chart illustrating a method of performing scheduling operations by the host based on the time required by the NVDIMM device to read the particular data and the information about operations at the NVDIMM device, according to an example embodiment as disclosed herein.

FIG. 5C is a flow chart 500c illustrating a method of performing the scheduling operations by the host 100 based on the time required by the NVDIMM device 200 to read the particular data and the information about operations at the NVDIMM device 200, according to an example embodiment as disclosed herein.

Referring to the FIG. 5C, at step 571, the host 100 determines that the information about operations at the NVDIMM device 200 does not indicates at least one of the miss case in read operation, the write through policy is used in the write operation, the flush operation, the garbage collection operation, the collate operation, the PIM function, the PIB function. For example, in the host 100 as illustrated in the FIG. 3A, the NVDIMM controller 120 is configured to determine that the information about operations at the NVDIMM device 200 does not indicates at least one of the miss case in read operation, the write through policy is used in the write operation, the flush operation, the garbage collection operation, the collate operation, the PIM function, the PIB function.

At step 572, the host 100 performs the scheduling operations based on the time required by the NVDIMM device 200 to read the particular data and the information about the operations at the NVDIMM device 200. For example, in the host 100 as illustrated in the FIG. 3A, the NVDIMM controller 120 is configured to perform the scheduling operations based on the time required by the NVDIMM device 200 to read the particular data and the information about the operations at the NVDIMM device 200.

FIG. 6 is a flow chart 600 illustrating a method of managing operations of the host using the NVDIMM device 200, according to an example embodiment as disclosed herein.

Referring to the FIG. 6, at step 602, the NVDIMM device 200 receives the read command from the host 100. For example, in the NVDIMM device 200 as illustrated in the FIG. 4A, the NVDIMM controller 250 is configured to receive the read command from the host 100.

At step 604, the NVDIMM device 200 sends the urgent message in response to the read command to the host 100. For example, in the NVDIMM device 200 as illustrated in the FIG. 4A, the NVDIMM controller 250 is configured to send the urgent message in response to the read command to the host 100.

At step 606, the NVDIMM device 200 receives the send command to retrieve the particular data from the host 100. For example, in the NVDIMM device 200 as illustrated in the FIG. 4A, the NVDIMM controller 250 is configured to receive the send command to retrieve the particular data from the host 100.

At step 608, the NVDIMM device 200 configures the message packet including the information about the time required by the NVDIMM device 200 to read the particular data and the information about the operations at the NVDIMM device 200. For example, in the NVDIMM device 200 as illustrated in the FIG. 4A, the NVDIMM controller 250 is configured to configure the message packet including the information about the time required by the NVDIMM device 200 to read the particular data and the information about the operations at the NVDIMM device 200.

At step 610, the NVDIMM device 200 sends the message packet to the host 100. For example, in the NVDIMM device 200 as illustrated in the FIG. 4A, the NVDIMM controller 250 is configured to 200 send the message packet to the host 100.

At step 612, the NVDIMM device 200 receives the power down entry command from the host 100. For example, in the NVDIMM device 200 as illustrated in the FIG. 4A, the NVDIMM controller 250 is configured to receive the power down entry command from the host 100.

At step 614, the NVDIMM device 200 receives the power down exit command from the host 100. For example, in the NVDIMM device 200 as illustrated in the FIG. 4A, the NVDIMM controller 250 is configured to receive the power down exit command from the host 100.

At step 616, the NVDIMM device 200 sends the read data ready signal to the host 100. For example, in the NVDIMM device 200 as illustrated in the FIG. 4A, the NVDIMM controller 250 is configured to send the read data ready signal to the host 100.

At step 618, the NVDIMM device 200 sends the particular data from the NVDIMM device 200 to the host 100. For example, in the NVDIMM device 200 as illustrated in the FIG. 4A, the NVDIMM controller 250 is configured to send the particular data from the NVDIMM device 200 to the host 100.

The various actions, acts, blocks, steps, or the like in the method may be performed in the order presented, in a different order or simultaneously. Further, in some example embodiments, some of the actions, acts, blocks, steps, or the like may be omitted, added, modified, skipped, or the like without departing from the scope of the example embodiments.

Figure 7A:
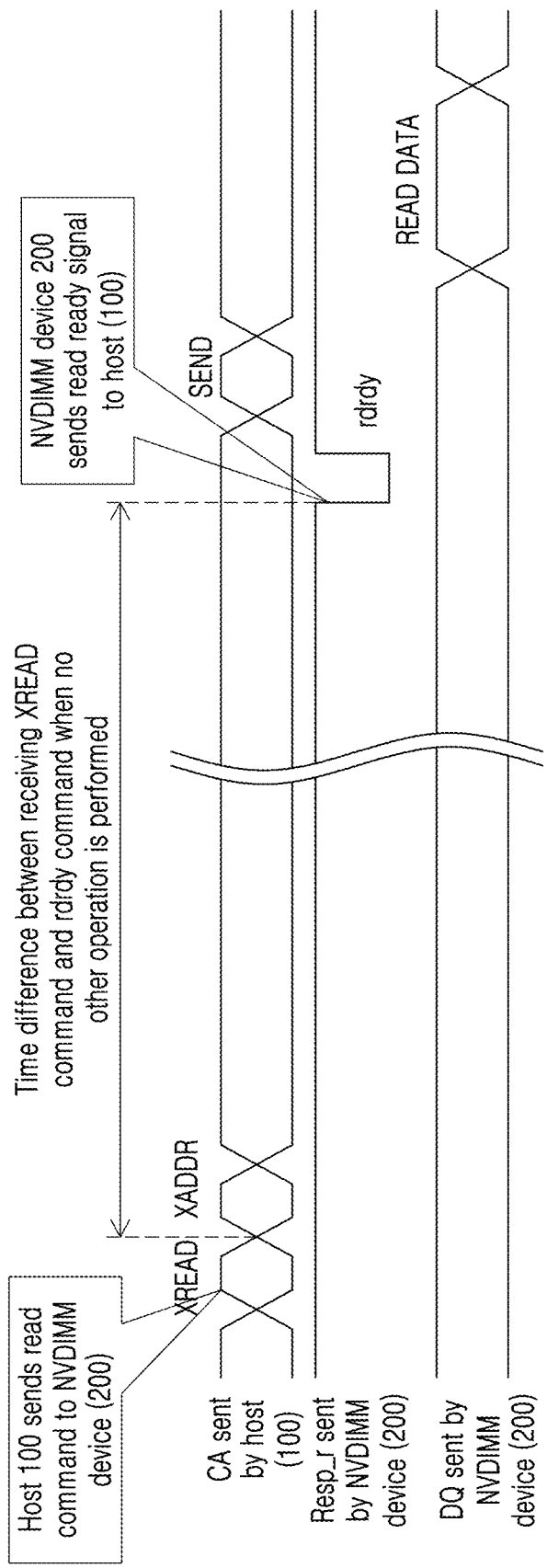
FIGS. 7A and 7B are an example illustrating a comparison of conventional method of reading data from the NVDIMM device by the host and the proposed method of reading data from the NVDIMM device by the host, according to an example embodiment as disclosed herein.
Figure 7B:
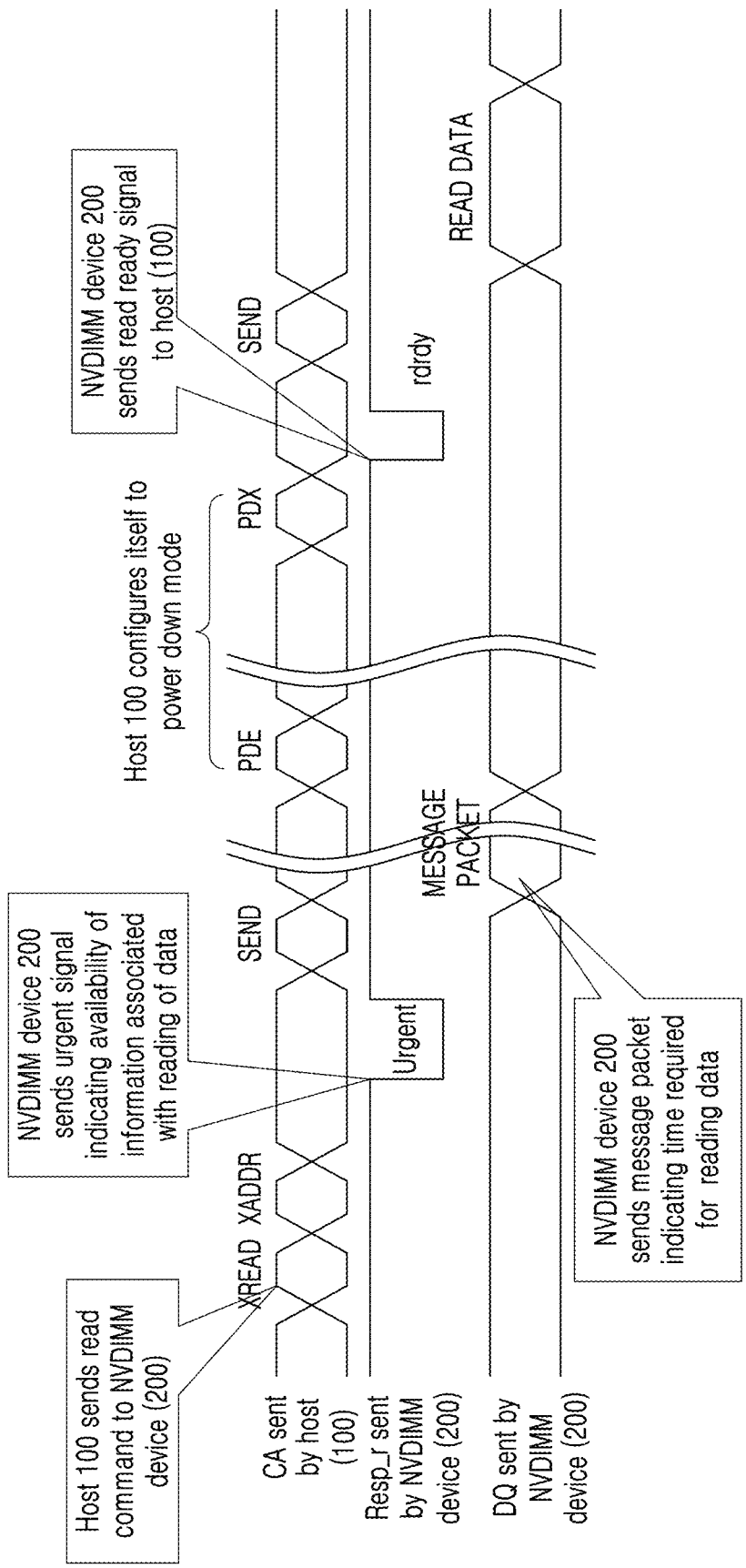

FIGS. 7A-7B are an example illustrating a comparison of conventional method of reading data from the NVDIMM device 200 by the host 100 and the proposed method of reading data from the NVDIMM device 200 by the host 100, according to an example embodiment as disclosed herein.

Referring to the FIG. 7A, the conventional timing diagram includes a command/address (CA) line associated with the host 100, a Resp_r response bus used for a handshaking associated with the NVDIMM device 200, and a data line (DQ) associated with the NVDIMM device 200.

The host 100 initially sends an 'xread' command followed by a 'xadd' command to the NVDIMM device 200 to read data from a specific address which is mentioned in the 'xadd' command. The NVDIMM device 200 takes an undetermined amount of time to read the data. After the data has been read, the NVDIMM device 200 tells the host 100 that the data is ready by sending a 'rdrdy' signal on the response bus. Further, on receiving the 'rdrdy' signal, the host 100 sends a 'send' command to the NVDIMM device 200 to retrieve the specific data. After a defined (or, alternatively, a pre-defined) delay, the NVDIMM device 200 returns the data to the host 100 on the data line. However, the time difference between the xread command sent by the host 100 and the rdrdy command sent by the NVDIMM device 200 may be relatively large.

In conjunction with FIG. 7A, the FIG. 7B indicates the timing diagram according to example embodiments. Unlike to the conventional methods and system, in one or more example embodiments, the NVDIMM device 200 sends the 'urgent' signal indicating the availability of the information associated with the data to be read by the NVDIMM device 200. In response to receiving the 'urgent' signal, the host 100 sends the 'send' command to the NVDIMM device 200. Further, the NVDIMM device 200 sends the message packet to the host 100, in response to the 'send' command. The message packet includes the information about the time required to read the particular data and the information about operations (such as for example, read and write) at the NVDIMM device 200. The information about operations at the NVDIMM device 200 indicates at least one of the miss case in the read operation, the write through policy is used in the write operation, the flush operation, the garbage collection operation, the collate operation, the PIM function, the PIB function. In response to receiving the message packet, the host 100 determines the time required by the NVDIMM device 200 to read the data. Further, based on the time required by the NVDIMM device 200, the host 100 configures itself in the power down mode and sends a power down entry (PDE) command to the NVDIMM device 200. The host 100 is configured in the power down mode till at least one of (i) the NVDIMM device 200 completes the flush operation of at least one of the read operation and a write operation, (ii) the NVDIMM device completes the garbage collection, (iii) the NVDIMM device 200 collate a group of RIDs and send it to the host 100, (iv) the NVDIMM device 200 performs the Process in Memory (PIM) function, and (v) the NVDIMM device 200 performs the Process in Buffer (PIB) function. In response to one of the above, the host 100 sends a power down exit (PDX) message to the NVDIMM device 200 to exit the power down mode.

Therefore, unlike to the conventional methods and systems, in one or more example embodiments, the method and system increases the processing power of the storage device. Further, the power down mode may be entered for a duration associated with a read latency of NOT AND (NAND) based media, which may be considerable.

The foregoing description of some of the example embodiments will so fully reveal the general nature of the example embodiments herein that others can, by applying current knowledge, readily modify and/or adapt for various applications such specific embodiments without departing from the example embodiments, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of some example embodiments, those skilled in the art will recognize that the example embodiments herein can be practiced with modification within the spirit and scope of the example embodiments as described herein.

We claim:

1. A method of controlling a Non-Volatile Dual In-Line Memory Module (NVDIMM) device by a host, the method comprises:

sending, by the host, a read command to the NVDIMM device requesting data from an address of the NVDIMM device;

receiving, by the host, a message packet from the NVDIMM device, the message packet including read time information informing the host of a read time required for the NVDIMM device to read the data and operational information indicating operations at the NVDIMM device; and performing, by the host prior to receiving the data from the NVDIMM device, one or more of configuration of a DIMM line in a power down mode or scheduling operations based on read time information and the operational information.

2. The method of claim 1, wherein the receiving comprises:

receiving, by the host, a signal in response to the read command from the NVDIMM device;

sending, by the host, a send command to the NVDIMM device subsequent to receipt of the signal to retrieve the data; and receiving, by the host, the message packet configured by the NVDIMM device in response to the send command.

3. The method of claim 1, wherein the performing the configuration of the DIMM line in the power down mode comprises:
  determining that the operational information indicates at least one of a miss case in a read operation, a write through policy when used in a write operation, a flush operation, a garbage collection operation, different collate operations, a process in memory (PIM) function, a process in buffer (PIB) function; and
  configuring the host in the power down mode based on the read time.

4. The method of claim 3, wherein the performing the configuration of the DIMM line in the power down mode comprises:
  performing, by the host, the power down mode until at least one of the NVDIMM device completes the flush operation of at least one of the read operation and the write operation, the NVDIMM device completes the garbage collection operation, the NVDIMM device collate a group of read identifiers (RIDs) and send it to the host, the NVDIMM device perform the PIM function, and the NVDIMM device perform the PIB function.

5. The method of claim 3, further comprises:
  sending, by the host, a power down entry command to the NVDIMM device;
  detecting, by the host, that the read time has elapsed;
  sending, by the host, a power down exit command to the NVDIMM device;
  receiving, by the host, a read data ready signal from the NVDIMM device; and
  retrieving, by the host, the data from the NVDIMM device in response to the read data ready signal.

6. The method of claim 1, wherein the performing the scheduling operations comprises:
  determining that the operational information does not indicate at least one of a miss case in a read operation, a write through policy is used in a write operation, a flush operation, a garbage collection operation, a collate operation, a process in memory (PIM) function, a process in buffer (PIB) function; and
  performing the scheduling operations based on the read time and the operational information.

7. A method of operating a Non-Volatile Dual In-Line Memory Module (NVDIMM) device, the method comprising:
  receiving, by the NVDIMM device, a read command from a host requesting data from an address of the NVDIMM device;
  configuring, by the NVDIMM device, a message packet, the message packet including read time information informing the host of a read time required for the NVDIMM device to read the data and operational information indicating operations at the NVDIMM device; and
  sending, by the NVDIMM device, the message packet to the host prior to sending the data to the host.

8. The method of claim 7, further comprises:
  receiving, by the NVDIMM device, a power down entry command from the host;
  receiving, by the NVDIMM device, a power down exit command from the host;
  sending, by the NVDIMM device, a read data ready signal to the host; and
  sending, by the NVDIMM device, the data from the NVDIMM device to the host.

9. The method of claim 7, wherein the configuring comprises:
  sending, by the NVDIMM device, a signal in response to the read command to the host;
  receiving, by the NVDIMM device, a send command to retrieve the data from the host subsequent to sending the signal; and
  configuring, by the NVDIMM device, the message packet in response to the send command such that the message packet includes the read time information and the operational information.

10. A host connected to a Non Volatile Dual Inline Memory Module (NVDIMM) device, the host comprising:
  a memory;
  a DIMM socket; and
  a NVDIMM controller coupled to the memory, the NVDIMM controller configured to,
    send a read command to the NVDIMM device requesting data from an address of the NVDIMM device,
    receive a message packet from the NVDIMM device, the message packet including read time information informing the host of a read time required for the NVDIMM device to read the data and operational information indicating operations at the NVDIMM device, and
    perform, prior to receiving the data from the NVDIMM device, one of configuration of the host in a power down mode or scheduling operations based on the read time and the operational information.

11. The host of claim 10, wherein the NVDIMM controller is configured to receive the message packet from the NVDIMM device by,
  receiving, by the host, a signal in response to the read command sent by the NVDIMM device;
  sending, by the host, a send command subsequent to receipt of the signal to retrieve the data to the NVDIMM device; and
  receiving, by the host, the message packet configured by the NVDIMM device in response to the send command.

12. The host of claim 10, wherein the host is configured in the power down mode by,
  determining that the operational information indicates at least one of a miss case in a read operation, a write through policy is used in a write operation, a flush operation, a garbage collection operation, a collate operation, a process in memory (PIM) function, a process in buffer (PIB) function; and
  configuring the host in the power down mode based on the read time.

13. The host of claim 12, wherein the host is configured to operate in the power down mode until at least one of the NVDIMM device completes the flush operation of at least one of the read operation and the write operation, the NVDIMM device completes the garbage collection operation, the NVDIMM device collate a group of read identifiers (RIDs) and send it to the host, the NVDIMM device perform the PIM function, and the NVDIMM device perform the PIB function.

14. The host of claim 12, wherein the NVDIMM controller is further configured to,
  send a power down entry command to the NVDIMM device,
  detect that the read time has elapsed, send a power down exit command to the NVDIMM device,
receive a read data ready signal from the NVDIMM device, and
retrieve the data from the NVDIMM device in response to the read data ready signal.

15. The host of claim 10, wherein the NVDIMM controller is configured to perform the scheduling operations by,
determining that the operational information does not indicates at least one of a miss case in a read operation, a write through policy is used in a write operation, a flush operation, a garbage collection operation, a collate operation, a process in memory (PIM) function, a process in buffer (PIB) function; and
performing the scheduling operations based on read time and the operational information.

16. A Non Volatile Dual Inline Memory Module (NVDIMM) device connected to a host, comprising:
a DRAM;
a DIMM socket; and
a NVDIMM controller configured to,
receive a read command from the host requesting data from an address of the NVDIMM device,
configure a message packet such that the message packet includes read time information informing the host of indicating a read time required for the NVDIMM device to read the data and operational information indicating operations at the NVDIMM device, and
send the message packet to the host prior to sending the data to the host.

17. The NVDIMM device of claim 16, wherein the NVDIMM controller is further configured to,
receive a power down entry command from the host,
receive a power down exit command from the host,
send a read data ready signal to the host, and
send the data from the NVDIMM device to the host.

18. The NVDIMM device of claim 16, wherein the NVDIMM controller is configured to configure the message packet by,
sending a signal in response to the read command to the host,
receiving a send command to retrieve the data from the host, and
configuring the message packet in response to the send command such that the message packet includes the read time and the operational information.

19. A Non-Volatile Dual In-Line Memory Module (NVDIMM) device assisted operations management system comprises:
a Non Volatile Dual Inline Memory Module (NVDIMM) device configured to configure a message packet such that the message packet includes read time information indicating a read time required for the NVDIMM device to read data and operational information about operations at the NVDIMM device; and
a host configured to,
send a read command to the NVDIMM device,
receive a signal in response to the read command from the NVDIMM device,
send a send command to retrieve a particular data to the NVDIMM device,
receive the message packet from the NVDIMM device,
send a power down entry command to the NVDIMM device,
detect that the read time has elapsed,
send a power down exit command to the NVDIMM device,
receive a read data ready signal from the NVDIMM device, and
retrieve the data from the NVDIMM device in response to the read data ready signal.

* * * * *